COMPUTER OPERATING METHOD AND APPARATUS

Filed Oct. 28, 1959 3 Sheets-Sheet 1

FRED W. SCHMIDLIN
JOHN N. COOPER
EUGENE C. CRITTENDEN, JR.
*INVENTORS*

BY Albert Rosen

*ATTORNEY*

COMPUTER OPERATING METHOD AND APPARATUS

Filed Oct. 28, 1959 3 Sheets-Sheet 2

FRED W. SCHMIDLIN
JOHN N. COOPER
EUGENE C. CRITTENDEN, JR.
*INVENTORS*

*BY* Albert Rosen
*ATTORNEY*

FRED W. SCHMIDLIN
JOHN N. COOPER
EUGENE C. CRITTENDEN, JR.
*INVENTORS*

BY Albert Rosen
*ATTORNEY*

United States Patent Office 3,048,825

Patented Aug. 7, 1962

3,048,825

COMPUTER OPERATING METHOD AND APPARATUS

Fred W. Schmidlin, Redondo Beach, John N. Cooper, Carmel, and Eugene C. Crittenden, Jr., Monterey, Calif., assignors to Space Technology Laboratories, Inc., a corporation of Delaware Filed Oct. 28, 1959, Ser. No. 849,322
9 Claims. (Cl. 340—173.1)

This invention relates generally to the computer art, and more particularly to new and novel operating methods and apparatus involved in computers having a memory storage bank incorporating a multiplicity of superconductive memory cells. While not limited thereto, the invention will be described herein as embodied in apparatus and operating methods for computers having superconductive memory cell storage banks wherein the memory cells are interconnected in multidimensional arrays.

As used herein, the term "superconductive memory cell" refers to a superconductive device capable of maintaining a memory signal in the form of a circulating electric current. The memory cell, for purposes of clarity, may be considered as being made up of a superconductive switching portion and a superconductive inductance portion connected in parallel. Both the switching and inductance portions are of materials that can become superconductive (i.e., exhibit no measurable electrical resistivity) when exposed to a temperature within a range close to absolute zero. Experimentation has revealed that these superconductive materials can be made to switch from a superconductive to an electrically resistive state (even though at a temperature within the superconductive temperature range) by applying an electric current of sufficient magnitude. This switching phenomenon, between the superconductive and resistive states, has been proposed for use in computers.

While superconductive computers appear attractive in view of their inherent compactness and fast reponse time, they have not proven entirely satisfactory in that they have been susceptible to amnesia, that is, a loss of memory signals during normal computer operation. For example, it has been noticed that under certain circumstances the magnitude of current stored in a superconductive memory cell may decay during successive interrogations of the cell, even though none of the interrogating signals are of a current magnitude sufficient to effect switching from a superconductive to a completely resistive state. If this phenomenon of current decay occurred in the superconductive memory cells of a computer memory bank, it can be appreciated that such a computer would have, at best, a very limited utility.

Accordingly, one of the objects of this invention is to provide an improved arrangement for switching superconductive memory cells between the superconductive and resistive states while preserving the stored memory current from decay.

In a given set of environmental conditions (for example, such as the ambient temperature and the material of which the elements are composed) there are types of memory cells that are responsive in two different manners at two respectively different current levels. At subjection of the cell to current magnitudes above the higher of the two levels the cell memory is established (or changed); at subjection to current magnitudes below the lower of the two levels the cell memory is substantially unaffected; and at subjection to current magnitudes between the two levels the cell memory is impaired—repeated interrogation of the cell by signals producing current magnitudes between the two levels results in the gradual erosion of the memory, a sort of computer amnesia.

When such memory cells are used in matrix form, it is desired that the coincidence of two interrogating currents at the cell be required before the cell memory is established or changed—it is desired that the presence of less than two interrogating pulses not affect the cell. Thus, in such a matrix it is desired that the combined magnitude of the resident memory current and the current of a single interrogating pulse be of a magnitude below the aforementioned lower of two current levels; it is also desired that the combined magnitude of two interrogating currents and the resident memory current give rise to a total current that is above the higher of the two levels. This kind of matrix is usually referred to as a two-dimensional matrix. The same general observations are true in matrices operating at higher than two dimensions. For example, if a four-dimensional matrix is used, the coincidence of four interrogating pulses is required for the establishment or change of the memory in the cell subjected to interrogation when the pulses are in the same direction as the resident memory current. In order to avoid cell memory loss, it is required that the sum of the four coinciding interrogating currents and the resident memory current be above the higher current level, and that the sum of three or fewer coinciding interrogation pulses and the resident memory current results in a total magnitude less than the lower of the two aforementioned current levels. The arrangement of the invention assures operation at current magnitudes such that the memories are preserved from subjection to current magnitudes in the amnesia producing intermediate current range.

In the drawing, wherein like reference characters and symbols refer to like elements or parameters:

Figure 3:
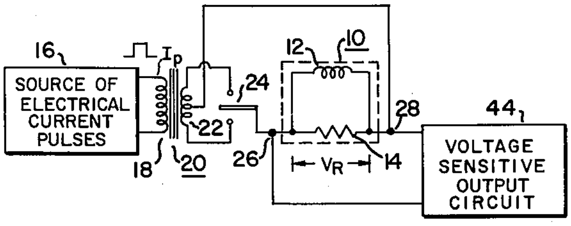
FIG. 3 is a schematic representation of a superconductive memory cell useful in practicing the invention.
Figure 6:
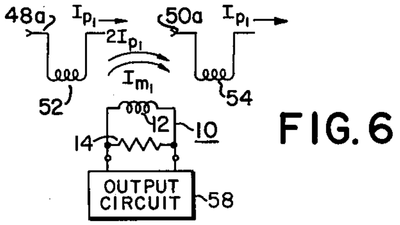
Figure 5:
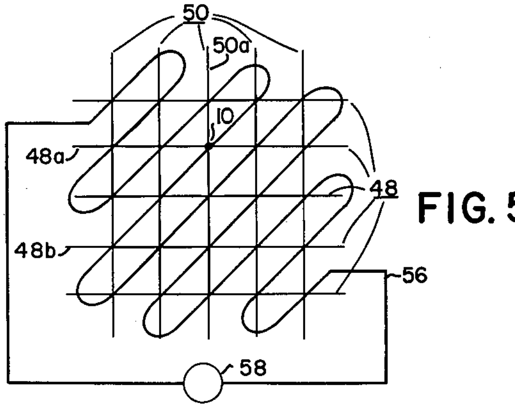
Figure 9:
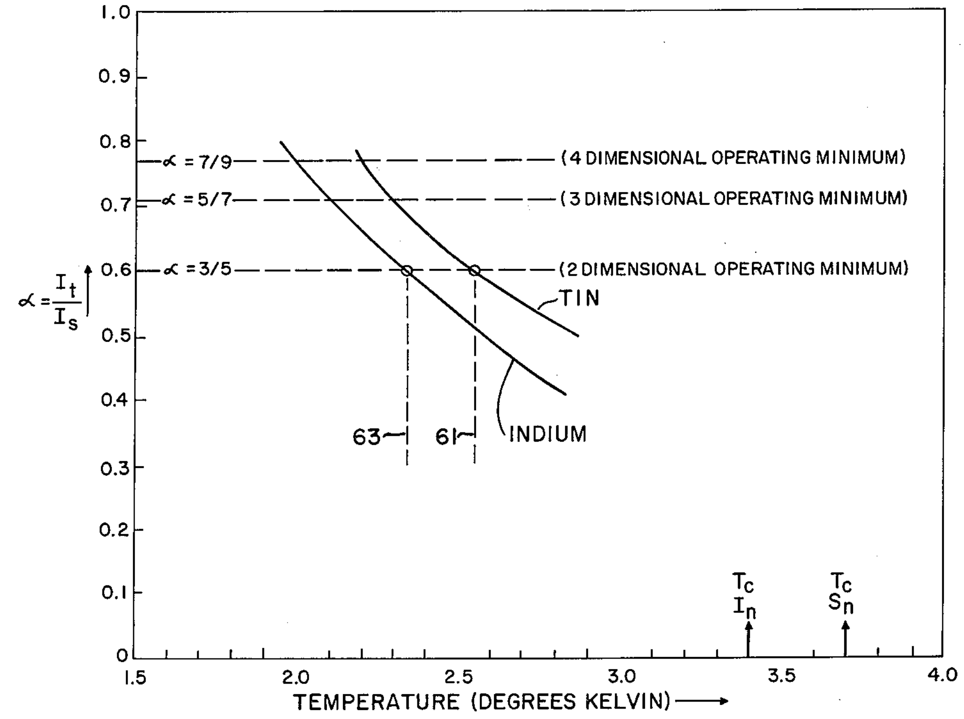
Figure 8:
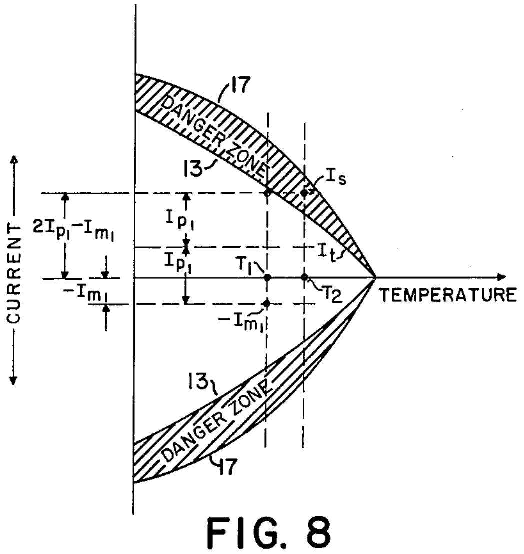
Figure 7:
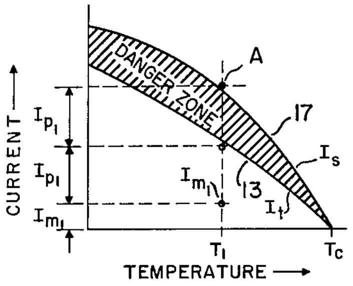
Figure 10:
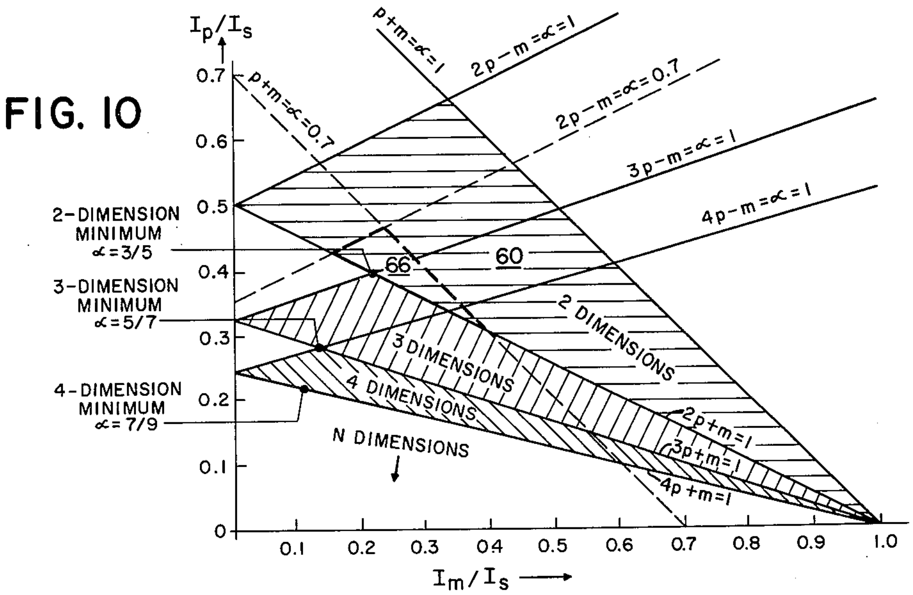
Figure 11:
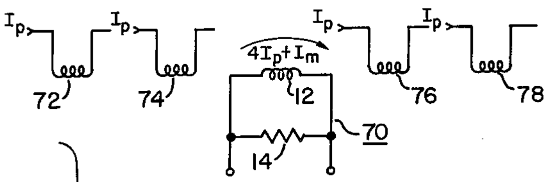
Figure 12:
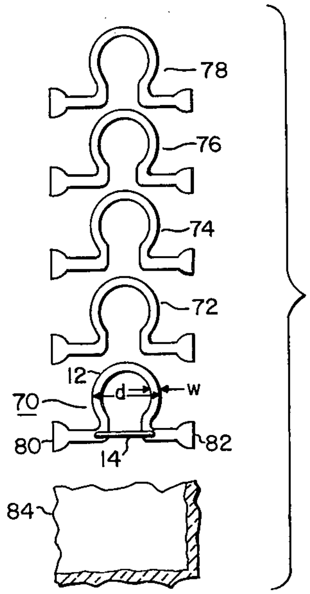

FIGS. 4*a* through 4*d* are waveform representations of electrical signal characteristics present in the memory cell of FIG. 3 during various operating conditions of the cell;

FIG. 5 is a diagrammatic representation of a two dimensional superconductive memory cell array;

FIG. 6 is a schematic illustration of a single memory cell and associated interrogating elements in the two dimensional memory cell array of FIG. 5;

FIGS. 7 and 8 are graphs illustrating operational aspects of thin film memory cells at various interrogation signal magnitudes, and illustrate amnesia-free and amnesia-prone ranges of operation;

FIG. 9 illustrates critical switching current characteristics, as a function of temperature, for tin and indium thin film memory cell portions as embodied in two, three, and four dimensional memory cell arrays;

FIG. 10 is a graph delineating combinations of temperature, interrogating current, and circulating memory cell current operating parameters within which amnesia-free operation may be realized for two, three, and four dimensional memory cell arrays;

FIG. 11 is a schematic illustration of a single memory cell and associated interrogating elements in a four dimensional memory cell array; and FIG. 12 is an exploded pictorial illustration of the arrangement depicted schematically in FIG. 11.

Since the arrangements of the invention are predicated upon certain effects peculiar to the phenomena of superconductivity, these effects will be discussed prior to a discussion of embodiments of the invention.

SUPERCONDUCTIVE PHENOMENA

At temperatures near absolute zero some materials apparently lose all resistance to the flow of electrical current and become what appear to be perfect conductors of electricity. This phenomenon is termed superconductivity and the temperature at which the change occurs, from a normally resistive state to the superconductive state, is called the transition temperature. For example, the following materials have transition temperatures, and become superconductive, as noted:

| | ° Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.4 |
| Thallium | 2.4 |
| Aluminum | 1.2 |

Only a few of the materials exhibiting the phenomenon of superconductivity are listed above. Other elements, and many alloys and compounds, become superconductive at temperatures ranging between 0° and around 20° Kelvin. A discussion of many such materials may be found in a book entitled, "Superconductivity" by D. Schoenberg, Cambridge University Press, Cambridge, England, 1952.

The above-listed transition temperatures apply only where the materials are in a substantially zero magnetic field. In the presence of a magnetic field the transition temperature is decreased. Consequently in the presence of a magnetic field a given material may be in an electrically resistive state at a temperature below the absence-of-magnetic-field or normal transition temperature. A discussion of this aspect of the phenomenon of superconductivity may be found in U.S. Patent 2,832,897, entitled, "Magnetically Controlled Gating Element," granted to Dudley A. Buck.

In addition, the above-listed transition temperatures apply only in the absence of electrical current flow through the material. When a current flows through a material, the transition temperature of the material is decreased. In such a case the material is in an electrically resistive state even though the temperature of the material is lower than the normal transition temperature. The action of a current in lowering the temperature at which the transition occurs (from a state of normal electrical resistivity to one of superconductivity) is similar to the lowering of the transition temperature by a magnetic field.

Accordingly, when a material is held at a temperature below its normal transition temperature for a zero magnetic field, and is thus in a superconductive state, the superconductive condition of the material may be extinguished by the application of an external magnetic field or by passing an electric current through the material.

Figure 1:
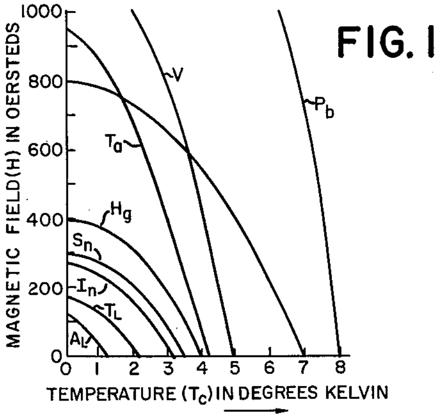
FIG. 1 is a graph illustrating the variation in transition temperatures for various materials as a function of the magnetic field to which they are subjected.

FIG. 1 illustrates the variation in transition temperatures ($T_c$) for several materials as a function of an applied magnetic field (H). In the absence of a magnetic field, the point at which each of the several curves intersects the abscissa is the transition temperature at which the material becomes superconductive. (The transition temperature for each material varies almost parabolically with the magnetic field applied to it, as expressed by the function $$\frac{H_c}{H_o}=1-\left(\frac{T}{T_c}\right)^2$$

where $H_c$ is the critical magnetic field density for effecting a transition from the superconductive to the resistive state at any given temperature T, $H_o$ is the intercept of a curve on the ordinate axis, at zero degrees Kelvin, and $T_c$ is the transition temperature of the material.)

The transition temperature is given in degrees Kelvin.

The particular material is superconductive for values of temperature and magnetic field falling beneath each of the several curves, while for values of temperature and magnetic field falling above a curve, the material possesses electrical resistance.

Figure 2:
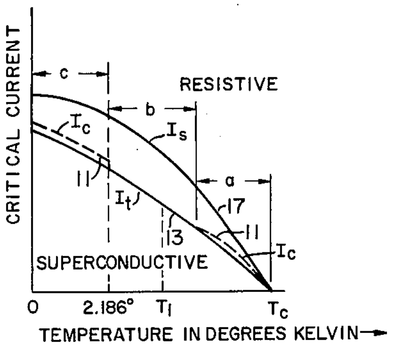
FIG. 2 is a graph of the transition temperature of a thin indium film as a function of the magnitude of electric current passed through the film.

Since a current flowing in the material has an effect upon the transition temperature that is similar to the effect of a magnetic field, the passage of a current through superconductive materials will yield curves similar to those shown in FIG. 1. It has been found that if the material is in the bulk form of a cylindrical wire, the transition curve relating critical direct electric current and transition temperature is relatively smooth. However, if the superconductive element takes the form of a relatively thin film, the shape of the curve relating critical direct electric current and transition temperature is somewhat different. The thin film relationship curve is illustrated in FIG. 2 by a dashed line 11. This line 11 illustrates the effect of varying a steady direct electric current through a thin film superconductive element made of indium, and immersed in a liquid helium bath. At any given temperature $T_1$, for example, the element becomes resistive as current is increased above a critical direct current value $I_c$.

In FIG. 2, three different temperature regions have been observed in connection with the phenomena depicted by line 11. In the first region (*a*), a temperature region immediately below the critical temperature $T_c$ (which is about 3.4 degrees Kelvin for indium in thin film form), complete transition of the film from the superconductive to the resistive state is preceded by localized transitions within the film. These localized transitions, which are thought to be due to mechanical imperfections in the film, occur at current densities or levels somewhat lower than the levels associated with the dashed line 11 critical direct current curve. These somewhat lower transition current levels are illustrated by the solid line 13, this line 13 defining the threshold current ($I_t$) at which the localized transitions are initiated. In the second temperature region (*b*), any localized transition is followed by a complete transition of the entire film at the same current level, and the lines 11 ($I_c$) and 13 ($I_t$) are coincident in this region.

In the third region (*c*), the region below 2.186 degrees Kelvin (the lambda point of helium), localized transitions of the film to the resistive state occur at current densities slightly lower than the current densities required for complete transition of the entire film. The lower current level required for the initiation of localized transition in this third region (*c*) is indicated in FIG. 2 by the solid line 13. The explanation for the phenomenon experienced in the third region (*c*) operation appears to be based upon the fact that at a temperature at and below the lambda point temperature, liquid helium becomes an almost perfect heat conductor. The switching speed of a superconductive element operated at a temperature below the lambda point is observed to be substantially higher than the switching speed of the superconductive element operated at a temperature above the lambda point.

From the foregoing it will be appreciated that the dashed line curve 11 of FIG. 2 represents the critical direct current ($I_c$) for initiating a complete superconductive-to-resistive transition in a thin film, while the solid line curve 13 of FIG. 2 represents the threshold current ($I_t$) wherein partial switching to a resistive state will occur.

The required switching current, for effecting a complete switch between the superconductive and resistive states, is higher for fast pulse switching than for slow or long time duration pulses. As has been indicated, the required switching current for the operation by application of steady state direct current or extremely long time duration pulses has been termed the critical current ($I_c$). As the switching pulses become shorter in duration, implying faster switching operation, the required switching current becomes higher. Finally, when relatively fast pulses are used to effect high speed switching (for example, faster than a microsecond per switching operation), the required switching current reaches an upper value, a critical fast switching current ($I_s$) (the solid line curve 17 in FIG. 2, which follows approximately a fourth power function). Operation at current levels equal to or greater than this critical fast switching current ($I_s$) assures complete, substantially instantaneous switching regardless of the pulse duration.

Thus, in memory cell switching two current levels become especially important: the threshold current level ($I_t$) below which no switching occurs and above which at least some switching is initiated, and the fast switching current level ($I_s$) above which complete switching is always effected during high speed operation and below which less than complete switching is effected at such operating speed. Subjection of a memory cell to successive current pulses at current magnitudes between these two levels ($I_t$ and $I_s$) may result in successive partial switching; this partial switching is undesirable since, as has been indicated before, this results in a degradation in the value of current (i.e., the memory) that may be contained in the memory cell.

SUPERCONDUCTIVE MEMORY CELL OPERATION

In one embodiment the memory cell 10 involved, illustrated schematically in FIG. 3, is in the form of a complete superconductive circuit loop capable of sustaining a persistent circulating current around the loop. The direction of the circulating current is representative of the stored information content of the loop or cell 10. The cell 10 is made up of an inductance portion 12 and a switching portion 14. The inductance and switching portions are connected to form the circuit loop referred to.

Both the inductance portion 12 and the switching portion 14 are constructed of materials capable of becoming superconductive, but the two portions are capable of switching between the superconductive and resistive states at different current values. The switching portion 14 is constructed to have switching current values (at which the material switches from a superconductive state to a resistive state) lower than the switching current values of the inductance portion 12.

In operation, the electrical circuit of FIG. 3 is held at a temperature below the transition temperatures for the zero switching current values of both the switching portion 14 and the inductance portion 12 (i.e., the temperature is selected to be below temperature $T_c$ in FIG. 2). Since the switching portion 14 is selected to have critical current values ($I_t$ and $I_s$) lower than, respectively, the critical current values of the inductance portion 12, the entire circuit loop 10 is superconductive for current flow less than the critical currents of the switching portion 14. Accordingly, no electrical resistance is presented to current flow and once a current is established in the loop 10, the current flows indefinitely around the loop. Thus, a persistent circulating current may be established in the circuit loop which will continue so long as both the inductance portion 12 and the switching portion 14 remain superconductive. However, since the switching portion 14 has critical current values lower than those of the inductance portion 12, the switching portion 14 is subject to being made electrically resistive by a current flowing around the loop 10 without affecting the superconductive state of the inductance portion 12; in such a case the value of the current may be in excess of the fast switching current level ($I_s$) of the switching portion 14 and lower than the fast switching current level ($I_s$) of the inductance portion 12.

In the arrangement of FIG. 3 a current pulse ($I_p$) for initiating a persistent circulating current (the memory to be stored) is derived from a source 16 of electrical current pulses. The output circuit of the source 16 of electrical current pulses is connected to a primary winding 18 of a transformer 20. A secondary winding 22 of the transformer 20 is center tapped, and a single-pole double-throw switch 24 is connected across the secondary winding 22 so that either positive or negative current pulses may be derived from the source 16 of electrical current pulses. The pulses ($I_p$) appearing between the movable element of the single-pole double-throw switch 24 and the center tap of the secondary winding 22 are applied to the circuit loop 10 consisting of the inductance portion 12 and the switching portion 14 via a pair of terminals 26 and 28.

Figure 4:
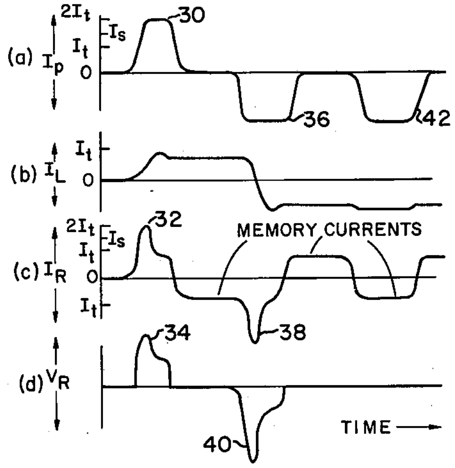

FIGS. 4(*a*) through 4(*d*) are a set of graphs illustrating the relationship between various current and voltage waves appearing in the circuit of FIG. 3. Referring to FIG. 4(*a*), an initial current pulse 30 ($I_p$) of approximately twice the threshold current level ($I_t$) of the resistance portion 14 is supplied by the source 16 of electrical current pulses. When the pulse 30 is first applied to the circuit loop 10, the current divides between the inductance portion 12 and the switching portion 14 in the ratio of their inductances. That is, in the transient period immediately after the application of the pulse ($I_p$) to the terminals 26 and 28, the amount of current flowing through the inductance portion 12 or the switching portion 14 is inversely proportional to the relative inductance of, respectively, the inductance portion 12 and the switching portion 14. This means that at first practically all of the current passes through the switching portion 14, since it has a relatively low inductance reactance. Thus as shown in FIG. 4(*c*), a momentary surge of current 32 passes through the switching portion 14. Since the surge of current 32 is in excess of the fast switching current ($I_s$) for the switching portion 14, the switching portion 14 ceases being superconductive and presents an electrical resistance to the flow of the current, with a voltage drop being developed across the switching portion 14 in a conventional fashion. Accordingly, as shown in FIG. 4(*d*) the voltage ($V_R$) appearing across the switching portion 14 is shown with a voltage pulse 34 corresponding in time to the surge of current 32 through the switching portion 14.

The appearance of the voltage across the switching portion 14 causes the amount of current flowing through the inductance portion 12 to increase and the amount of current flowing through the switching portion 14 to decrease until the current flowing through the switching portion 14 drops to a value that is less than the fast switching current ($I_s$) and less than, but close to, the threshold current level ($I_t$). At this time the switching portion 14 becomes superconductive so that no voltage appears across the switching portion 14. Where the amplitude of the current pulse 30 is approximately two times the threshold current level ($I_t$) of the switching portion 14, the current divides between the inductance portion 12 and the switching portion 14 as shown in FIGS. 4(*b*) and 4(*c*). When the current pulse 30 drops to zero, the current through the inductance portion 12 continues to flow due to the action of the inductance portion 12 in resisting any change in the current flow. However, since the switching portion 14 has substantially no inductance and is superconductive, the current flow through the switching portion 14 reverses and again becomes less than, but close to, the threshold current level (slightly less than $-I_t$). Since both the inductance portion 12 and the switching portion 14 are superconductive for values of current flow less than the threshold current level ($I_t$), the current flows from the inductance portion 12 around the circuit loop 10 through the switching portion 14 and back through the inductance portion 12 as a persistent current which continues to circulate indefinitely around the loop so long as the inductance and switching portions remain superconductive. By applying to the loop 10 either a positive or negative current pulse ($I_p$), via the switch 24, a circulating persistent current may be induced around the circuit loop in either direction. Thus, the circuit loop 10 has two distinct modes of operation, each mode corresponding to the direction of persistent current flow around the loop. The direction of current flow may be selected in accordance with information to be stored. This persistent current flow is the memory current referred to.

In order to sense the direction of persistent or memory current flow, and to read out the information previously stored in the circuit loop 10, a current pulse ($I_p$) may be applied to the circuit loop 10 from the source 16 of electrical current (interrogating) pulses. The magnitude of the current pulse ($I_p$) is such that the sum of the magnitudes of the pulses ($I_p$) and the resident memory current is greater than the fast switching current level ($I_s$) of the switching portion 14.

In FIG. 4 a negative going pulse 36 is additive with respect to a persistent circulating current flowing through the switching portion 14. The sum of the currents in the switching portion 14 produces a surge of current 38 in excess of the fast switching current level ($I_s$) of the switching portion 14 which causes this switching portion to become electrically resistive with a voltage pulse 40 appearing across the switching portion 14. The voltage pulse 40 reverses the direction of current flow through the inductance portion 12 as shown in FIG. 4(*b*), and when the current pulse 36 disappears the inductance portion 12 causes a current to continue flowing around the circuit loop 10 as a persistent circulating current in a direction opposite to the direction of persistent current before the appearance of the current pulse 36. A voltage sensitive output circuit 44, connected across the terminals 26 and 28, senses the appearance of the voltage pulse 40. In contrast, where a current pulse is applied to the circuit loop 10 which is subtractive with respect to the persistent circulating current flowing through the switching portion 14, such as the negative going pulse 42, the current flowing through the switching portion 14 is momentarily decreased, with the switching portion 14 remaining superconductive, and no voltage pulse appears at the terminals 26 and 28 to the output circuit 44.

Thus, by applying a current pulse to the circuit loop 10, the direction of persistent memory current flow may be ascertained from the appearance of the voltage pulse across the switching portion 14 in the case where the applied pulse is additive with respect to the persistent current flowing in the switching portion 14 and the lack of an appearance of a voltage pulse across the switching portion 14 when the applied pulse is subtractive with respect to the persistent current flowing through the switching portion 14.

From the above it is apparent that the circuit loop 10 of FIG. 3 is capable of two distinct modes of operation in which a persistent memory current flows in a selected direction for an indefinite period to represent information, and the direction of persistent memory current flow may be sensed to read out and recover the information.

SUPERCONDUCTIVE MEMORY CELL BANK AND ITS OPERATION

In one embodiment of this invention, a number of superconductive memory cells are used to form a computer memory bank. Such a memory bank may be connected, for example, in a two dimensional array and any number of superconductive memory cells may be interconnected in the array. Such an arrangement is represented diagrammatically in FIG. 5. The totality of horizontal circuits 48 represents one dimension and the totality of vertical circuits 50 represents a second dimension. Each intersection (illustrated in FIG. 6) of the individual horizontal and vertical circuits, as for example the intersection of horizontal circuit 48*a* and vertical circuit 50*a*, is made up of a superconductive memory cell 10 and two induction elements (one horizontal circuit element 52 and one vertical circuit element 54). The outputs of each superconductive memory cell (FIG. 5) are interconnected through an interconnecting circuit 56 to a voltage sensing means 58. Each individual superconductive memory cell 10 (FIG. 6) may have a memory current that flows in it in either direction around the memory cell loop 10. Information can be obtained from each cell 10 by noting the presence of either a positive memory current or a negative memory current. In order to interrogate the particular superconductive memory cell 10 shown in FIG. 6, one horizontal interrogating circuit 48*a* and one vertical interrogating circuit 50*a* are each energized by a pulse of current, $I_p$. For purposes of explanation it will be assumed that the magnitude of the horizontal interrogating pulses equals the magnitude of the vertical interrogating pulses, and that both interrogating pulses are applied to a memory cell in the same direction. The current pulse $I_p$ in the horizontal interrogating circuit, 48*a*, as it flows through the horizontal inductive circuit element 52 induces a similar current pulse in the inductance portion 12 of the superconductive memory cell 10. Similarly, the current pulse $I_p$ in the vertical interrogating circuit 50*a*, as it flows through the vertical inductive circuit element 54 induces a similar current pulse in the inductance portion 12 of the superconductive memory cell 10. When a memory current $I_m$ having the same flow direction as each of the induced interrogating pulses $I_p$ is present in the superconductive memory cell 10, the sum of the two induced current pulses ($2I_p$) plus the memory current ($I_m$) must be sufficient to at least equal the fast switching current level ($I_s$) of the switching portion 14.

The required relative values of the various currents $I_m$, $I_p$, $I_s$, and $I_t$ will be discussed in connection with FIGS. 6 and 7. If, for example, the superconductive memory cell 10 was maintained at temperature $T_1$, the memory current could have the value $I_{m_1}$ and each interrogating pulse current could have the value $I_{p_1}$. Since the total of the three currents ($I_{m_1}$ plus $2I_{p_1}$), point A in FIG. 7, exceeds the fast switching current $I_s$ of the switching portion 14, the switching portion will switch momentarily to a resistive state and a momentary voltage will be perceived in the output sensing circuit 58. This gives the desired information signal in response to the interrogation.

When the superconductive memory cell 10 of FIG. 6 has a memory current flowing in the opposite direction, a different result is obtained. This different result will be explained in connection with FIG. 8. If the superconductive memory cell 10 is maintained at temperature $T_1$, then the simultaneous application of the two interrogation current pulses $I_{p_1}$ from the horizontal interrogation circuit 48*a* and the vertical interrogation circuit 50*a* induces in the switching portion 14 (FIG. 6) a total current pulse equal to $2I_{p_1}$ minus $I_{m_1}$. As shown in FIG. 8, this resultant magnitude of current pulse is insufficient to achieve the fast switching current level ($I_s$) of the switching portion 14, and thus this portion does not become resistive and no voltage is obtained in the output sensing circuit 58 of FIGS. 5 and 6. This absence of voltage, in response to interrogation, is also a usable information signal.

It will be noted from an examination of FIGS. 7 and 8, in the light of the foregoing discussion, that when the two interrogation pulses ($I_{p_1}$) are additive with respect to the memory current ($I_{m_1}$), the resultant total current magnitude is at least equal to the fast switching current level ($I_s$); it is also noted that when the two interrogation pulses are subtractive relative to the memory current, the resultant total current magnitude is less than the threshold current level ($I_t$). Thus, during operation at temperature $T_1$, the resultant total current never assumes a magnitude in the zone intermediate the fast switching and threshold current levels. Since, as has been indicated above and as will be indicated in detail below, the memory cell is prone toward amnesia during operation in this intermediate or danger zone, operation of the two dimensional memory cell bank of FIGS. 5 and 6 at temperature $T_1$ will not be subject to memory current degradation and resultant amnesia.

By way of contrast, it has been found that if the operation of the circuits of FIGS. 5 and 6 is at a different temperature $T_2$, where the ratio of the threshold current level ($I_t$) to the fast switching current level ($I_s$) is less than the ratio at the first temperature $T_1$ (and is less than a critical ratio of 3/5 to be discussed), the resultant total interrogation and memory current may fall in the amnesia prone or danger zone. Thus, as illustrated in FIG. 8, when a memory cell is operated at temperature $T_2$, and the interrogation pulses $I_{p_1}$ are subtractive with respect to the memory current $I_{m_1}$, the resultant current $2I_{p_1}—I_{m_1}$ lies in the amnesia prone zone. Successive interrogations under these conditions will result in memory degradation.

Memory degradation, and resultant amnesia, may also occur from other aspects of normal memory cell bank operation. During the interrogation of any one memory cell in a memory cell bank a number of other cells will also be subjected to induced current. Thus, in the operation of the matrix of FIG. 5, the interrogation of memory cell 10 by coincident vertical and horizontal pulses results in the subjection of all of the other cells in the same vertical and horizontal lines 50*a* and 48*a*, respectively, to an induced current of $I_p$. When the interrogation current pulse $I_p$ is applied to vertical circuit line 50*a*, a similar current pulse is applied to the vertical circuit elements (each corresponding to the vertical circuit element 54 of FIG. 6) of all of the memory cells associated with that vertical circuit line 50*a*. Similarly, current pulses of magnitude $I_p$ are applied to the horizontal circuit elements of all of the memory cells associated with horizontal circuit line 48*a* when this line is energized. Thus, during the interrogation of any one cell (with a total interrogating current of $2I_p$), a number of other cells are subjected to currents of magnitude $I_p$. Since some of these other cells may contain a circulating memory current $I_m$, these other cells may experience a momentary current of a high as $I_p+I_m$. In order to avoid the memory degradation referred to, the conditions must be such that this current magnitude ($I_p+I_m$) be less than the threshold current level $I_t$.

The memory degradation disadvantages may be overcome in accordance with the arrangements of the invention. In order to prevent memory current degradation in, for example, a two dimensional memory bank array as shown in FIG. 5, certain conditions must be satisfied. The first of these is that the sum of the two interrogating current pulses ($2I_p$) plus the memory current ($I_m$) in the switching portion of a superconductive memory cell must be greater than the critical fast switching current level ($I_s$) of the switching portion of the cell:

$$2I_p+I_m>I_s \quad (1)$$

The second condition is that a single interrogating current pulse ($I_p$) plus the memory current ($I_m$) must be less than the threshold current level ($I_t$) of the switching portion:

$$I_p+I_m<I_t \quad (2)$$

The third condition is that the sum of the two interrogating current pulses ($2I_p$) in a direction opposite the direction of the memory current, plus the memory current ($I_m$), be less than the threshold current ($I_t$) of the switching portion:

$$2I_p-I_m<I_t \quad (3)$$

Normalizing inequalities in the above 1, 2, and 3 with respect to $I_s$, and letting $$p=\frac{I_p}{I_s},\ m=\frac{I_m}{I_s},\ \text{and}\ \alpha=\frac{I_t}{I_s}$$

they become:

$$2p+m>1 \quad (4)$$
$$p+m<\alpha \quad (5)$$
$$2p-m<\alpha \quad (6)$$

At the limit, these become equalities, and the following equations are obtained:

$$2p+m=1 \quad (7)$$
$$p+m=\alpha \quad (8)$$
$$2p-m=\alpha \quad (9)$$

Solving these simultaneous equations yields the following results:

$$p=2/5 \quad (10)$$
$$m=1/5 \quad (11)$$
$$\alpha=3/5 \quad (12)$$

or $$I_p=2/5I_s \quad (13)$$
$$I_m=1/5I_s \quad (14)$$
$$I_t=3/5I_s \quad (15)$$

Thus, the equations set a lower limit for $\alpha$ of 3/5. A value of $\alpha$ of 3/5 or greater will permit operation of a superconductive memory cell in a two dimensional array without memory current degradation. A graphical representation of this will be illustrated in connection with region 60 of FIG. 10.

Equations 7, 8, and 9 above were derived for a two dimensional array. The general case, where there are N dimensions, provides the following:

$$Np+m=1 \quad (16)$$
$$(N-1)p+m=\alpha \quad (17)$$
$$Np-m=\alpha \quad (18)$$

Solving these simultaneous equations in terms of N, the relationships for the general case are obtained:

$$p=\frac{2}{2N+1} \quad (19)$$

$$m=\frac{1}{2N+1} \quad (20)$$

$$\alpha=\frac{2N-1}{2N+1} \quad (21)$$

By equation 21 it can be seen that the minimum $\alpha$ ratio $$\left(\text{that is, } \frac{I_t}{I_s}\right)$$

is 5/7 for a three dimensional array, 7/9 for a four dimensional array, and 9/11 for a five dimensional array.

FIG. 10 illustrates graphically the permissible operating regions for multidimensional computer memory element arrays. This graph was constructed from Equations 16, 17, and 18 by letting N equal successively two dimensions, three dimensions, and four dimensions.

The chart of FIG. 10 will first be considered in connection with a two dimensional matrix, such as the one illustrated in FIGS. 5 and 6. The conditions defined in Equations 7, 8, and 9 restrict operation of a two dimensional matrix to the cross-hatched region designated in the chart by numeral 60. The allowable operating region 60 for two dimensional operation is bounded by the three Equations 7, 8, and 9. Since these equations may be extremely difficult to realize in practice (for example, the limit of the ratio $I_t$ to $I_s$ is where $I_t=I_s$) the practical operating region is an appreciably smaller area than that designated by numeral 60. For example, as a practical matter the ratio of $I_t$ to $I_s$ may be readily realized where this ratio is .7. In the chart of FIG. 10 line $2p+m=1$, and dashed lines $p+m=\alpha=.7$, and $2p-m=\alpha=.7$ delineate the small portion 66 of the generalized operating region 60 wherein operation at $\alpha$ having a maximum of .7 (and, of course, a minimum of .6) may be realized for two dimensional matrix. Since the smallest possible useful value of $\alpha$ for a two dimensional matrix is the case where $\alpha=3/5$, operation at this minimum is only at the point indicated in FIG. 10 by the legend "2 dimension minimum $\alpha=3/5$." If indium is used for the memory cell switching portions in the matrix in question, the value $\alpha=3/5$ occurs at a temperature close to that indicated in FIGS. 7 and 8 at temperature $T_1$.

The same Equations 16, 17, and 18, as applied to three and four dimensional matrices, yield similar permissible operating regions. In the case of the three dimensional matrix, the theoretical permissible operating region is bounded by the three lines $3p+m=1$, $2p+m=\alpha=1$, and $3p-m=\alpha=1$. It is realized, of course, that the practical operating region will be less than the over-all region delineated. Similarly, four dimensional operation is defined by the lines $4p+m=1$, $3p+m=\alpha=1$, and $$4p-m=\alpha=1$$

It will be noted from the foregoing (and in the chart of FIG. 10) that the permissive operating regions, for different dimensional operation, are mutually exclusive. Thus, for fastest computer operation, any set of interrogating pulse and memory current values that are useful in operation in any selected dimension will not be useful for operation in any other dimension.

As has been indicated before, both the threshold current level $I_p$ and the fast switching current level $I_s$ are functions of temperature, as shown in FIGS. 2, 7, and 8. Therefore the operating temperature selected for operation of a two dimensional superconductive element memory bank type computer must be in the region where the threshold current level $I_t$ of the switching portion is at least ⅗ of the fast switch current level $I_s$ of the switching portion. FIG. 9 shows the ratio ($\alpha$) of the threshold current level $I_t$ to the fast switching current level $I_s$ as a function of temperature for typical indium and tin thin film switching portions. It can be seen in the graph of FIG. 9 that the critical transition temperature for the tin switching portion is approximately 3.7° K. and for the indium switching portion is approximately 3.4° K. However, the $\alpha$ ratio limitation requires that, in order to avoid memory degradation, a two dimensional memory bank using tin switching portions be operated at temperatures below about 2.55° K. (to the left of dashed temperature line 61 of FIG. 9), and below about 2.35° K. (to the left of dashed line 63) when indium switching portions are used.

FIG. 11, a schematic illustration of a four dimensional memory cell 70 and related interrogating elements, illustrates how the arrangement of the invention may also be advantageously practiced in memory banks having more than two dimensions, that is, in memory banks wherein each memory cell is connected to be interrogated only upon the coincidence of more than two interrogating signals. This cell 70 of FIG. 11 requires the coincidence of four interrogating signals (each of magnitude $I_p$), one signal in each of four interrogating circuit elements 72, 74, 76, and 78, in order to determine the presence and direction of a memory current in the cell. As in the case of the two dimensional cell and array of FIGS. 5 and 6, operation is required outside of the amnesia prone region (FIGS. 7 and 8) defined between the threshold current level $I_t$ and the fast switching current level $I_s$.

FIG. 12 is an exploded pictorial representation of the four dimensional memory cell and associated interrogating elements discussed in connection with FIG. 11. In the example of FIG. 12 the memory cell 70 includes a generally horseshoe shaped superconductive thin film inductance portion 12. The inductance portion 12 may, for example, be a thin lead film having a thickness of the order of 1,000 Angstrom units, a width $w$ of the order of about .010 inch, and a diameter (dimension $d$) of 3⁄16 inch. The switching portion 14 takes the form of a thin indium film having a length of the order of ⅛ inch, a width of the order of 60 microns, and a thickness of the order of 0.1 micron. The junctions of the inductance portion 12 and the switch portion 14 are provided with widened ears 80 and 82 to serve as terminals for connection of the memory cell 70 to other circuits. The ears 80 and 82 may be of the same material and thickness as that of the inductance portion 12.

Each of the interrogating circuit elements 72, 74, 76, and 78 takes the form of horseshoe shaped elements of the same size and shape as that of the inductance portion 12 of the memory cell 70; this is so that the inductance portion 12 and the interrogation elements 72 through 78 may be superimposed in close adjacency to each other to effect close coupling of all of these members.

In the actual construction of such a memory cell and associated interrogation elements, a substrate 84, such as of glass or quartz, is used to provide the physical support for the memory cell assembly. A layer of lead (not shown) is vacuum deposited on the substrate 84 to serve as a magnetic shield to better confine the electric currents associated with the memory cell 70 to the region of the memory cell. An insulating material layer (not shown) is then vacuum deposited on the lead shield. The insulating material layer may comprise zinc sulfide that is vacuum deposited to a thickness of the order of 30,000 Angstrom units. The inductance portion 12 of the memory cell 70, and the ears 80 and 82 thereof, are then vacuum deposited on the insulating material layer. The switching portion 14 is then vacuum deposited. Next, another vacuum deposited insulation layer (not shown) is set down over the memory cell 70. The thickness of this insulation layer must be appreciably more than 0.02 micron since it has been found that no measurable resistance exists between superconductive elements separated by insulating materials of this order of thickness. Thus, for example, the insulating layer may here, too, be of the order of many thousands of Angstrom units in thickness. The interrogation elements 72, 74, 76, and 78 are each in turn vacuum deposited over the previous vacuum deposited materials, with layers of insulating materials (not shown) being vacuum deposited between successive interrogation elements. As in the case of the inductance portion 12, each of the interrogation elements 72 through 78 may take the form of lead films having a thickness of the order of 1,000 Angstrom units and a width of .010 inch. Finally, a final insulating layer is desirably vacuum deposited over the other layers and members, and another layer of lead shielding (not shown) is vacuum deposited over the assembly thus formed; here, again, the lead layer serves as a shield element for better confining electrical currents to the region of the memory cell 70.

The use of memory cell matrices of more than two dimensions, for example, of the kind discussed in connection with FIGS. 11 and 12, prove especially advantageous in minimizing the number of lead-in wires required between the matrix and the ancillary circuitry. For example, if Z is the number of memory cells in the computer memory bank, only $$3\sqrt[3]{Z}+1$$

lead-in wires are needed for three dimensional operation, while $2\sqrt{Z}+1$ lead-in wires are required for two dimensional operation. Thus, for a one million memory cell bank, 301 lead-in wires are required for a three dimensional array, while 2,001 lead-in wires are needed for a two dimensional array. The number of lead-in wires required decreases even further with increasing orders of dimensions.

For most superconductive materials useful in computers the value of $I_t$ becomes a greater percentage of $I_s$ as the temperature decreases. Therefore, in general, the potentially utilizable number of dimensions in a computer increases with decreasing operating temperatures.

From the foregoing it is apparent that the arrangement of the invention sets out the conditions for switching in multidimensional arrays of superconductive memory cells while preserving stored memory current from decay.

What is claimed is:

1. Method of operating a superconductive computer, wherein said computer includes a memory bank including crossed lines of superconductive memory cells collectively defining a two dimensional matrix, with each cell having a switching portion and an inductance portion connected in a circuit loop, and wherein the switching portion of each cell has a threshold current level and a fast switching current level that are, respectively, less than the threshold current level and fast switching current level of the inductance portion of the cell, and wherein each of the cells are arranged to be energized by the coincidence of a first signal applied to one of the matrix lines and a second signal applied to a second matrix line crossing said one of the matrix lines, said method comprising the steps of: cooling said superconductive memory cells to an operating temperature within the range between zero degrees Kelvin and a predetermined maximum temperature, said maximum temperature being approximately that temperature where the threshold current level of the switching portion of one of the memory cells is approximately three-fifths of the fast switching current level of the switching portion; establishing a memory current in a first of said plurality of superconductive memory cells, the magnitude of the memory current being approximately equal to one-fifth the value of the fast switching current level of said switching portion at said operating temperature; applying to the one of the matrix lines a first interrogating current pulse whose magnitude as received in the inductance portion of the cell is approximately equal to two-fifths of the fast switching current level of said switching portion; applying to the second of the matrix lines a second interrogating current pulse whose magnitude as received in the inductance portion of the cell is approximately equal to two-fifths of the fast switching current level of said switching portion at said operating temperature; and measuring the voltage in said switching portion of said superconductive memory cell to thereby effect an interrogation of the memory current established in said first cell.

2. Method of operating a superconductive computer, wherein said computer includes a memory bank including crossed lines of super-conductive memory cells collectively defining a two dimensional matrix, with each cell having a thin tin film switching portion and an inductance portion connected in a circuit loop, and wherein the switching portion of each cell has a threshold current level and a fast switching current level that are, respectively, less than the threshold current level and fast switching current level of the inductance portion of the cell, and wherein each of the cells are arranged to be energized by the coincidence of a first signal applied to one of the matrix lines and a second signal applied to a second matrix line crossing said one of the matrix lines, said method comprising the steps of: cooling said superconductive memory cells to an operating temperature within the range between zero degrees Kelvin and approximately 2.55 degrees Kelvin; establishing a memory current in a first of said plurality of superconductive memory cells, the magnitude of the memory current being approximately equal to of the order of one-fifth the value of the fast switching current level of said switching portion at said operating temperature; applying interrogating pulses to each of the two matrix lines at magnitudes, as received in the inductance portion of the cell, that are collectively approximately equal to of the order of four fifths of the fast switching current level of said switching portion; and measuring the voltage in said switching portion of said superconductive memory cell to thereby effect an interrogation of the memory current established in said first cell.

3. Method of operating a superconductive computer, wherein said computer includes a memory bank including crossed lines of super-conductive memory cells collectively defining a three dimensional matrix, with each cell having a switching portion and an inductance portion connected in a circuit loop, and wherein the switching portion of each cell has a threshold current level and a fast switching current level that are, respectively, less than the threshold current level and fast switching current level of the inductance portion of the cell, and wherein each of the cells are arranged to be energized by the coincidence of a first signal applied to a first one of the matrix lines, a second signal applied to a second matrix line crossing said first one of the matrix lines, and a third signal applied to a third matrix line crossing both of said first and second matrix lines, said method comprising the steps of: cooling said superconductive memory cells to an operating temperature within the range between zero degrees Kelvin and a predetermined maximum temperature, said maximum temperature being approximately that temperature where the threshold current level of the switching portion of one of the memory cells is approximately five-sevenths of the fast switching current level of the switching portion; establishing a memory current in a first of said plurality of superconductive memory cells, the magnitude of the memory current being approximately equal to one-seventh of the value of the fast switching current level of said switching portion at said operating temperature; applying to each of the first, second, and third of the matrix lines an interrogating current pulse whose magnitude as received in the inductance portion of the cell is approximately equal to two-sevenths of the fast switching current level of said switching portion at said operating temperature; and measuring the voltage in said switching portion of said superconductive memory cell to thereby effect an interrogation of the memory current established in said first cell.

4. In a method of operating an array of superconductive memory cells, each arranged to be interrogated upon the coincidence of signals from a plurality of interrogating circuits, and wherein each cell comprises a circuit loop capable of sustaining therein a circulating memory current and including a superconductive switching portion and a superconductive inductance portion, and wherein the switching portion is associated with a fast switching current characteristic and a threshold current characteristic that are each a function of the temperature of said switching portion, with the fast switching current characteristic having a current level at any given temperature that is greater than the current level associated with the threshold current characteristic at the given temperature, the improvement which comprises the steps of: maintaining the memory cell array at a temperature at which the ratio of said threshold current level to said fast switching current level is defined by the relationship:

$$\frac{I_t}{I_s} \geq \frac{2N-1}{2N+1}$$

where $I_t$ is the threshold current level, $I_s$ is the fast switching current level, and N is the number of coincident interrogating circuits associated with each of said memory cells; establishing in one of the cells to be interrogated a persisting circulating memory current; and subjecting each of the cells to be interrogated to a coincidence of interrogating pulses of equal magnitude, as received by the interrogated cell, and where each pulse magnitude received by the interrogated cell is defined by the simultaneous inequalities:

$$Np+m>I_s$$
$$p+m<I_t$$
$$Np-m<I_t$$

where $p$ is equal to the magnitude of each interrogating pulse as received by the interrogated cell, and $m$ is equal to the magnitude of the memory current in the interrogated cell.

5. The method according to claim 4, wherein N equals 3.

6. The method according to claim 4, wherein N equals 4.

7. The method according to claim 4, wherein N equals 2.

8. The method according to claim 7, wherein the temperature at which the memory cell is maintained is at least as low as about 2.55 degrees Kelvin, whereby the switching portion of the cell may be constructed of a thin tin film.

9. The method according to claim 7, wherein the temperature at which the memory cell is maintained is at least as low as about 2.35 degrees Kelvin, whereby the switching portion of the cell may be constructed of a thin indium film.

References Cited in the file of this patent

UNITED STATES PATENTS

| | | |
|---|---|---|
| 2,740,949 | Counihan | Apr. 3, 1956 |
| 2,914,735 | Young | Nov. 24, 1959 |

OTHER REFERENCES

"Trapped-Flux Superconducting Memory" by J. W. Crowe, I.B.M. Journal, October 1957, pp. 295–302.

"Cryogenic Devices in Logical Circuitry and Storage" by J. W. Bremer, Electrical Manufacturing, February 1958, pp. 78–83.